(12) United States Patent
Jin et al.

(10) Patent No.: US 10,824,259 B2
(45) Date of Patent: Nov. 3, 2020

(54) DISPLAY DEVICE

(71) Applicant: Samsung Display Co., Ltd., Yongin-Si (KR)

(72) Inventors: Chang Kyu Jin, Anyang-si (KR); Yang Wan Kim, Hwaseong-si (KR); Joong Soo Moon, Hwaseong-si (KR); Young Jin Cho, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/512,379

(22) Filed: Jul. 16, 2019

(65) Prior Publication Data

US 2020/0110497 A1 Apr. 9, 2020

(30) Foreign Application Priority Data

Oct. 5, 2018 (KR) .................. 10-2018-0118760

(51) Int. Cl.
*G06F 3/041* (2006.01)
(52) U.S. Cl.
CPC .......... *G06F 3/0412* (2013.01); *G06F 3/0416* (2013.01)

(58) Field of Classification Search
CPC .. G06F 3/0412; G06F 3/0416; G06F 3/04164; G06F 3/0446; G02F 1/13338; G02F 1/136286; G02F 2001/13629
See application file for complete search history.

(56) References Cited

FOREIGN PATENT DOCUMENTS

KR 10-2015-0039934 A 4/2015
KR 10-2015-0144258 A 12/2015

*Primary Examiner* — Nelson M Rosario
(74) *Attorney, Agent, or Firm* — Innovation Counsel LLP

(57) ABSTRACT

A display device is provided. The display device comprising: a display area; a non-display area on an outer side of the display area; a data line unit comprising a plurality of data lines; a power line unit disposed over the plurality of data lines and comprising a plurality of power lines; and a touch line unit disposed over the power line unit, comprising a plurality of touch lines and comprising a fan-out portion, wherein the touch line unit comprises, in the fan-out portion, a plurality of first sub-touch line units extended toward one side in a first direction, and a plurality of second sub-touch line units extended toward an opposite side in the first direction, wherein a number of lines of the first sub-touch line units is equal to a number of lines of the second sub-touch line units, and wherein the touch line unit comprises a portion where the touch line unit overlaps with the power line unit.

20 Claims, 12 Drawing Sheets

DISPLAY DEVICE

This application claims priority from Korean Patent Application No. 10-2018-0118760, filed on Oct. 5, 2018, in the Korean Intellectual Property Office, and all the benefits accruing therefrom under 35 U.S.C. § 119, the disclosure of which is incorporated herein by reference in its entirety.

BACKGROUND

1. Field of the Disclosure

The present disclosure relates to a display device. More specifically, the present disclosure relates to a layout design of lines in a display device.

2. Description of the Related Art

Display devices become more and more important as multimedia technology evolves. Accordingly, a variety of types of display devices such as liquid-crystal display (LCD) devices and organic light-emitting display (OLED) devices are currently used. Among them, organic light-emitting display devices are self-luminous devices having excellent viewing angles and thus are attracting attention as next generation display devices.

A driver unit for driving the pixel circuits in the display area may be disposed in the non-display area under the display panel. When the width of the driver unit is different from the width of the display panel in the horizontal direction, signal lines connecting the driver unit with the display panel may be disposed in the non-display area. The non-display area can be regarded as a sort of dead space in terms of the function of the display device. In order to reduce the dead space, various types of line designs may be required.

SUMMARY

Aspects of the present disclosure provide a display device with fan-out configuration in its non-display area NDA, thereby reducing the dead space.

It should be noted that objects of the present disclosure are not limited to the above-mentioned object; and other objects of the present disclosure will be apparent to those skilled in the art from the following descriptions.

According to an exemplary embodiment of the present disclosure, touch signal lines fan out, so that the dead space can be reduced.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an exemplary embodiment of the present disclosure, a display device comprising: a display area; a non-display area on an outer side of the display area; a data line unit comprising a plurality of data lines; a power line unit disposed over the plurality of data lines and comprising a plurality of power lines; and a touch line unit disposed over the power line unit, comprising a plurality of touch lines and comprising a fan-out portion, wherein the touch line unit comprises, in the fan-out portion, a plurality of first sub-touch line units extended toward one side in a first direction, and a plurality of second sub-touch line units extended toward an opposite side in the first direction, wherein a number of lines of the first sub-touch line units is equal to a number of lines of the second sub-touch line units, and wherein the touch line unit comprises a portion where the touch line unit overlaps with the power line unit.

In an exemplary embodiment, wherein the touch line unit and the power line unit are extended in a second direction intersecting the first direction in the portion where the touch line unit overlaps with the power line unit.

In an exemplary embodiment, wherein the portion where the touch line unit overlaps with the power line unit is located on an inner side of the data line unit.

In an exemplary embodiment, the display device further comprises a common electrode formed over an entire surface of the display area, wherein the common electrode is extended to the non-display area.

In an exemplary embodiment, wherein a region where the common electrode is formed comprises the fan-out portion.

In an exemplary embodiment, wherein the common electrode comprises an edge formed in the first direction, wherein the plurality of first sub-touch line units comprises a first touch line closest to the edge in the fan-out portion, wherein the plurality of second sub-touch line units comprises a second touch line closest to the edge in the fan-out portion, and wherein a distance between the first touch line and the edge is equal to a distance between the second touch line and the device.

In an exemplary embodiment, wherein the distance is equal to or greater than 72 μm.

In an exemplary embodiment, wherein the common electrode is electrically connected to at least one power line among the power line unit.

In an exemplary embodiment, the display device further comprises a data pad terminal unit connected to the data lines; a power pad terminal unit connected to the power lines; and a touch pad terminal unit connected to the touch lines, wherein the touch pad terminal unit, the power pad terminal unit, and the data pad terminal unit are sequentially spaced apart from one another in the first direction.

In an exemplary embodiment, wherein the data lines are extended in a second direction intersecting the first direction from the data pad terminal unit, and wherein the touch lines comprise a portion extended in the second direction and a portion bent toward the data line unit.

In an exemplary embodiment, wherein the display device comprises a region adjacent to one edge of the non-display area, where the data pad terminal unit, the power pad terminal unit and the touch pad terminal unit are formed, and wherein the display device comprises a bending region between the display area and the region where the data pad terminal unit, the power pad terminal unit and the touch pad terminal unit are formed.

In an exemplary embodiment, wherein the display device comprises in the bending region a region where the touch line unit overlaps with the power line unit.

In an exemplary embodiment, the display device further comprises a plurality of touch sensing electrodes disposed in the display area, wherein the plurality of touch sensing electrodes comprises: a plurality of first touch sensing electrodes extended in a predetermined direction; and a plurality of second touch sensing electrodes disposed adjacent to the first touch sensing electrodes in a direction intersecting the direction in which the plurality of first touch sensing electrodes is extended, wherein a width of the second touch sensing electrodes is smaller than a width of the first touch sensing electrodes, and wherein the plurality of first touch sensing electrodes and the plurality of second touch sensing electrodes are electrically connected to the respective touch lines.

In an exemplary embodiment, wherein the plurality of second touch sensing electrodes is extended in a same direction as a direction in which the plurality of first touch sensing electrodes is extended.

In an exemplary embodiment, wherein the plurality of second touch sensing electrodes is extended in a second direction intersecting the first direction.

According to another exemplary embodiment of the present disclosure, a display device comprising: a base substrate comprising a display area where a plurality of pixels and a plurality of touch electrodes are disposed, and a non-display area on an outer side of the display area; a first line layer disposed on the base substrate in the non-display area; a second line layer disposed over the first line layer in the non-display area; and a third line layer disposed over the second line layer in the non-display area and comprising a fan-out portion, wherein the second line layer and the third line layer comprise an overlapping region in the non-display area, wherein each of the pixels comprises a transistor and a light-emitting element connected to the transistor, wherein the first line layer is electrically connected to the transistor, wherein the second line layer is electrically connected to the light-emitting element, wherein the third line layer is electrically connected to the touch electrode, wherein the third line layer comprises, in the fan-out portion, a plurality of first sub-line unit units extended toward one side in a first direction, and a plurality of second sub-line unit units extended toward an opposite side in the first direction, and wherein a number of the first sub-line unit units is equal to a number of the second sub-line unit.

In an exemplary embodiment, wherein the first line layer, the second line layer and the third line layer are insulated from one another.

In an exemplary embodiment, wherein in a region where the second conductive layer overlaps with the third conductive layer, the second conductive layer and the third conductive layer are extended in a second direction intersecting the first direction.

In an exemplary embodiment, wherein the touch electrodes comprise: a plurality of first sensing electrodes extended in the first direction; and a plurality of second sensing electrodes extended in the second direction and traversing the first sensing electrodes, wherein the first sensing electrodes are insulated from the second sensing electrodes.

In an exemplary embodiment, wherein the light-emitting element comprises a first electrode, an emissive layer disposed on the first electrode, and a second electrode disposed on the emissive layer, wherein the second electrode is disposed through an entire surface of the display area, wherein the second electrode is extended so that the third line layer covers the fan-out portion, and wherein the second line layer is electrically connected to the second electrode.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
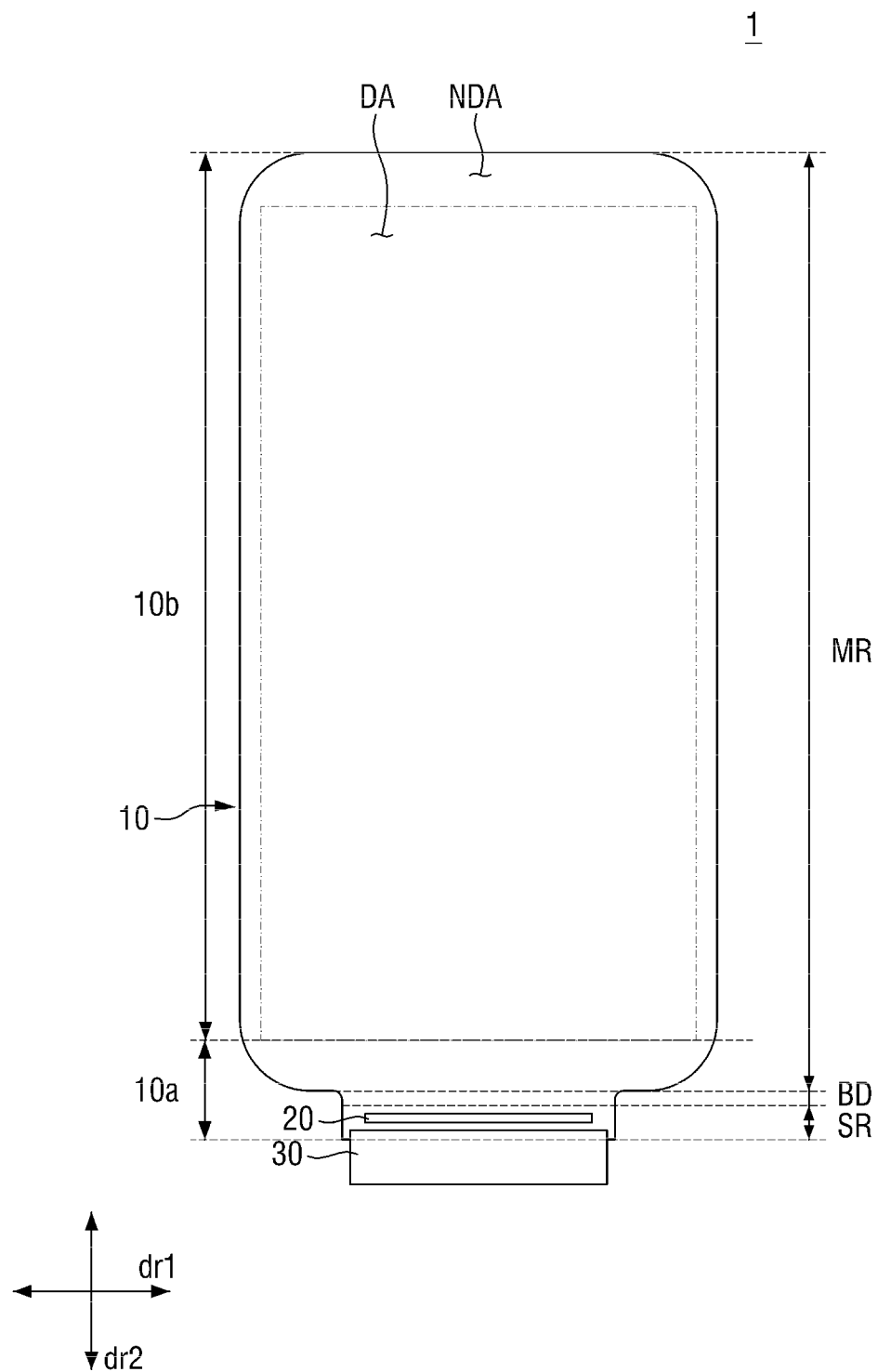
FIG. 1 is a plan view of a display device according to an exemplary embodiment of the present disclosure;.

The present disclosure will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

Display devices according to a variety of exemplary embodiments of the present disclosure may be used as a display screen of a variety of devices that present video or still image or stereoscopic display devices, including portable electronic devices such as a mobile communications terminal, a smart phone, a tablet PC, a smart watch and a navigation device, as well as devices such as a television, a laptop computer, a monitor, an electronic billboard and a device for the Internet of Things.

Hereinafter, embodiments of the present disclosure will be described in detail with reference to the accompanying drawings. In the following description, an organic light-emitting display device will be described as an example of a display device. It is, however, to be understood that the present disclosure is not limited thereto. The display device according to exemplary embodiments of the present disclosure can also be applied to other display devices such as a liquid-crystal display device and a field emission display device, without departing from the scope of the present disclosure. Like reference numerals denote like elements throughout the drawings.

Figure 2:
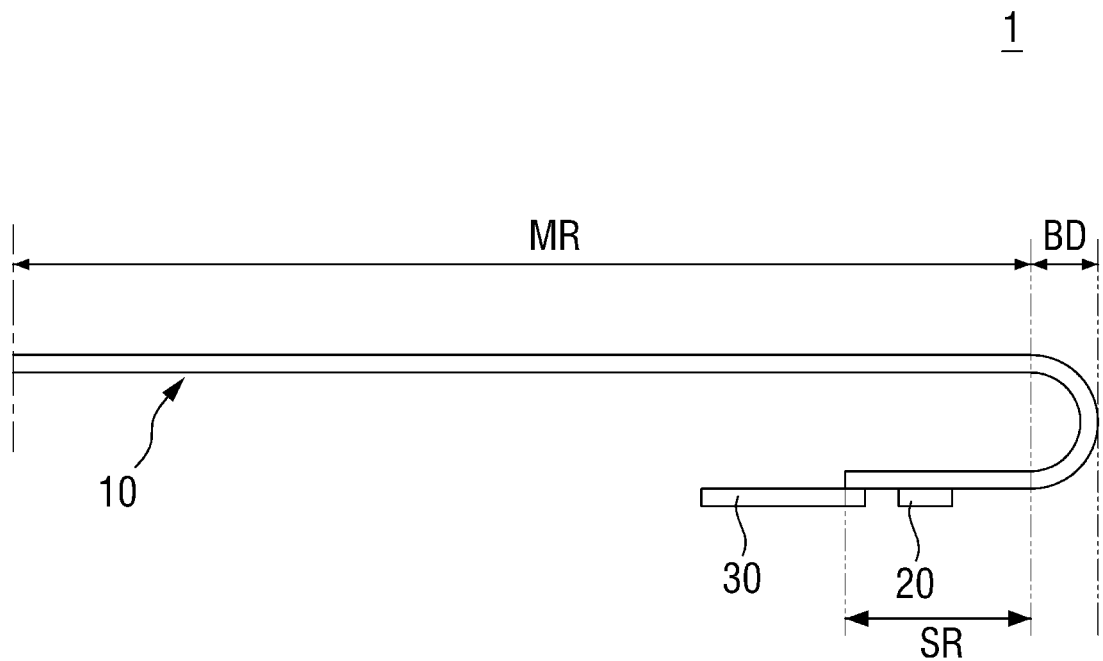
FIG. 2 is a cross-sectional view of a part of a display device according to an exemplary embodiment of the present disclosure.

FIG. 1 is a plan view of a display device according to an exemplary embodiment of the present disclosure. FIG. 2 is a cross-sectional view of a part of a display device according to an exemplary embodiment of the present disclosure.

An organic light-emitting display device 1 may include a display panel 10. The display panel 10 may include a flexible substrate including a flexible polymer material such as polyimide. Accordingly, the display panel 10 may be curved, bent, folded, or rolled.

The display panel 10 may include a main region MR and a panel bending region BD connected to one side of the main region MR. The display panel 10 may further include a sub-region SR connected to the panel bending region BD and overlapped with the main region MR in the thickness direction.

The area of the display panel 10 where images are displayed is defined as a display area DA. The area of the display panel 10 where no image is displayed is defined as a non-display area NDA. The display area DA of the display panel 10 is disposed in the main region MR. The other area than the display area DPA serves as the non-display area NDA of the display panel 10. In an exemplary embodiment, in the main region MR, the edge portions of the display area DA, the entire panel bending region BD and the entire sub-region SR may be the non-display area NDA. It is, however, to be understood that the present disclosure is not limited thereto. The panel bending region BD and/or the sub-region SR may also include the display area DA.

The main region MR may have a shape generally similar to that of the organic light-emitting display device 1 when viewed from the top. The main region MR may be a flat area located in one plane. It is, however, to be understood that the present disclosure is not limited thereto. At least one of the edges of the main region MR except for the edge (side) connected to the panel bending region BD may be bent to form a curved surface or may be bent at a right angle.

The display area DA of the display panel 10 may be disposed at the center of the main region MR. The display area DA is defined as the area for displaying an image. the display area DA may also be used as an element for detecting an external environment. That is to say, the display area DA may be used as the area for displaying images and also as the area for recognizing a user's touch input or fingerprint. In an exemplary embodiment, the display area DA may have a flat shape. It is, however, to be understood that the present disclosure is not limited thereto. The display area DA may be bent at least partially. In such case, at least one of the edges of the display area DA in the main region MR except for the edge (side) connected to the panel bending region BD may be bent to form a curved surface or may be bent at a right angle.

In an exemplary embodiment, the display area DA may have a rectangular shape. For example, the display area DA may have a rectangular shape having shorter sides in a first direction dr1 and longer sides extended in a second direction dr2 intersecting the first direction dr1. It is, however, to be understood that the present disclosure is not limited thereto. The display area DA may have a polygonal shape, a circular shape, or an irregular shape. As used herein, for convenience of illustration, the horizontal direction in the drawings is defined as the first direction dr1, and the direction intersecting the first direction dr1 is defined as the second direction dr2. That is to say, the second direction dr2 may represent the vertical direction in the drawings. It is to be noted that the exemplary embodiments of the present disclosure are not limited by the directions defined above and the first and second directions dr1 and dr2 may be any relative directions intersecting each other.

The display area DA may include a plurality of pixels. Each of the pixels may include an emissive layer and a circuit layer for controlling the amount of light emitted from the emissive layer. The circuit layer may include a variety of lines, electrodes and at least one transistor. The emissive layer may include an \organic light-emitting material. The emissive layer may be sealed by an encapsulation layer. The configuration of each of the pixels will be described in detail later.

The display area DA may include a plurality of touch sensing electrodes. The plurality of touch sensing electrodes may include driving electrodes and sensing electrodes. The driving electrodes and the sensing electrodes may be disposed on the same layer but are not limited thereto. They may be disposed on different layers. The plurality of touch sensing electrodes may be disposed on the encapsulation layer 131. The touch sensing electrodes will be described later.

The non-display area NDA is defined as the area that is disposed outside the display area DA and does not display an image. In an exemplary embodiment, the non-display area NDA may be disposed outside the display area DA to surround it. It is, however, to be understood that the present disclosure is not limited thereto. The shape of the display area DA and the shape of the non-display area NDA may be designed relatively. In an exemplary embodiment, the non-display area NDA may have a flat shape. It is, however, to be understood that the present disclosure is not limited thereto. The non-display area NDA may have a shape that is bent at least partially.

In the main region MR, the non-display area NDA may be located around the display area DA. In the main region MR, the non-display area NDA may be extended from the outer border of the display area DA to the edge of the display panel 10. In the non-display area NDA of the main region MR, signal lines for applying signals to the display area DA or driving circuits may be disposed. The outermost black matrix may be, but is not limited to being, disposed in the non-display area NDA of the main region MR.

Although not shown in the drawings, a speaker module, a microphone module, a camera module, a sensor module, etc. may be disposed in the non-display area NDA. In an exemplary embodiment, the sensor module may include at least one of an illuminance sensor, a proximity sensor, an infrared sensor, and an ultrasonic sensor.

The panel bending region BD is connected to the main region MR. For example, the panel bending region BD may be connected to a shorter side of the main region MR. The width of the panel bending region BD may be less than the width (width of a shorter side) of the main region MR. The portions where the main region MR meets the panel bending region BD may be cut in an L-shape.

In the panel bending region BD, the display panel 10 may be bent downward in the thickness direction, i.e., in the direction away from the display surface with a curvature. Although the panel bending region BD may have a constant radius of curvature, the present disclosure is not limited thereto. It may have different radii of curvature for difference sections. As the display panel 10 is bent in the panel bending region BD, the surface of the display panel 10 is turned over. Specifically, the surface of the display panel 10 facing upward may be bent such that it faces outward in the panel bending region BD and then faces downward.

The sub-region SR is extended from the panel bending region BD. The sub-region SR may be extended in a direction parallel to the main region MR after the display device has been bent. The sub-region SR may overlap with the main region MR in the thickness direction of the display panel 10. The sub-region SR may overlap with the non-display area NDA at the edge of the main region MR and may also overlap with the display area DA of the main region MR.

The width of the sub-region SR may be, but is not limited to being, equal to the width of the panel bending region BD.

A drive chip 20 may be disposed on the sub-region SR of the display panel 10. The drive chip 20 may include an integrated circuit for driving the display panel 10. In an exemplary embodiment, the integrated circuit may be, but is not limited to, a data driving integrated circuit that generates and provides data signals. The drive chip 20 may be mounted on the display panel 10 in the sub-region SR. The drive chip 20 is mounted on the surface of the display panel 10 which is the display surface. As the panel bending region BD is bent and turned over as described above, the drive chip 20 is mounted on the surface of the display panel 10 facing downward in the thickness direction, such that the upper surface of the drive chip 20 may face downward.

The drive chip 20 may be attached on the display panel 10 by an anisotropic conductive film or on the display panel 10 by ultrasonic bonding. The width of the drive chip 20 may be less than the width of the display panel 10 in the horizontal direction. The drive chip 20 is disposed at the center of the sub-region SR in the horizontal direction and the left and right edges of the drive chip 20 may be spaced apart from the left and right edges of the sub-region SR, respectively.

A pad unit PD may be formed at the end of the sub-region SR of the display panel 10, and a display driving substrate 30 may be connected on the pad unit PD. The display driving substrate 30 may be a flexible printed circuit board or film.

Signal lines may be disposed in the sub-region SR, the panel bending region BD and the main region MR of the display panel 10. The signal lines may be extended from the pad unit PD in the sub-region SR to the main region MR via the panel bending region BD. Some of the signal lines, e.g., power lines SP and touch lines TP may be extended from the end of the pad unit PD in the sub-region SR to the panel bending region BD and in turn to the main region MR without passing through the drive chip 20. Some others of the signal lines e.g., data signal lines may be extended from the end of the pad unit PD to the panel bending region BR and in turn to the main region MR through the drive chip 20.

In order to cover the entire main region MR which is relatively large, some of the signal lines may fan out so that they spread out toward the main region MR from the sub-region SR and/or the panel bending region BD. Some of the signal lines which bypass the drive chip 20 may be extended along the outer sides of the signal lines passing through the drive chip 20.

The signal lines passing through the panel bending region BD are bent together with the panel, and accordingly the signal lines may be subjected to bending stress. Such bending stress may cause cracks or disconnection of the signal lines. To prevent this, the signal lines passing through the panel bending region BD may be formed of a more flexible material. In addition, the signal lines passing through the panel bending region BD may have a multi-path structure in which multiple line layers are electrically connected with one another through contacts in the vertical direction so that even when one line layer is disconnected, a signal can be transmitted through another line layer electrically connected thereto.

Hereinafter, the relationship among the signal lines arranged therein will be described. In the following description, an edge portion 10a which is a part of the non-display region NDA of the display panel 10 and is adjacent to the pad unit PD, and a rest portion 10b which is the display area DA and the rest part of the non-display region NDA of the display panel 10 are defined for convenience of illustration.

Figure 3:
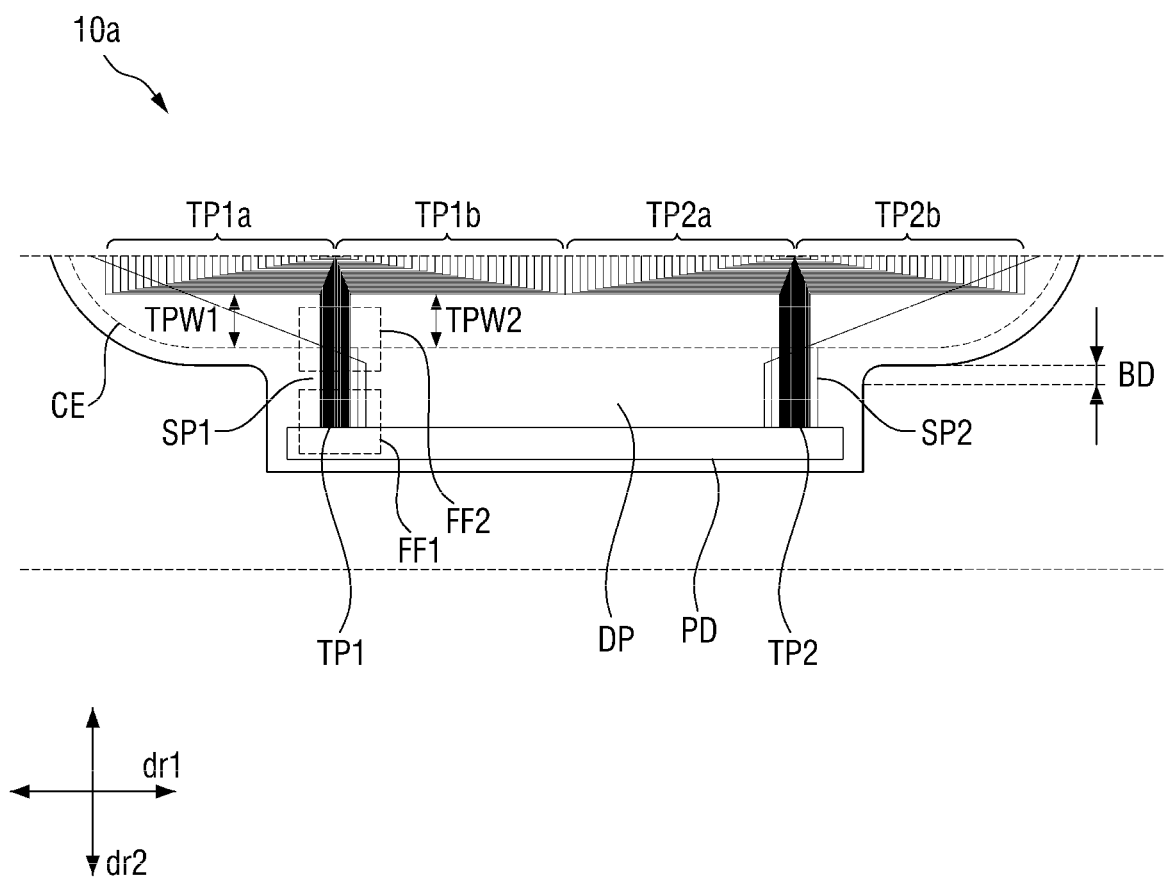
FIG. 3 is a view showing a layout of the portion 10a of the display panel of FIG. 1 in more detail.
Figure 4:
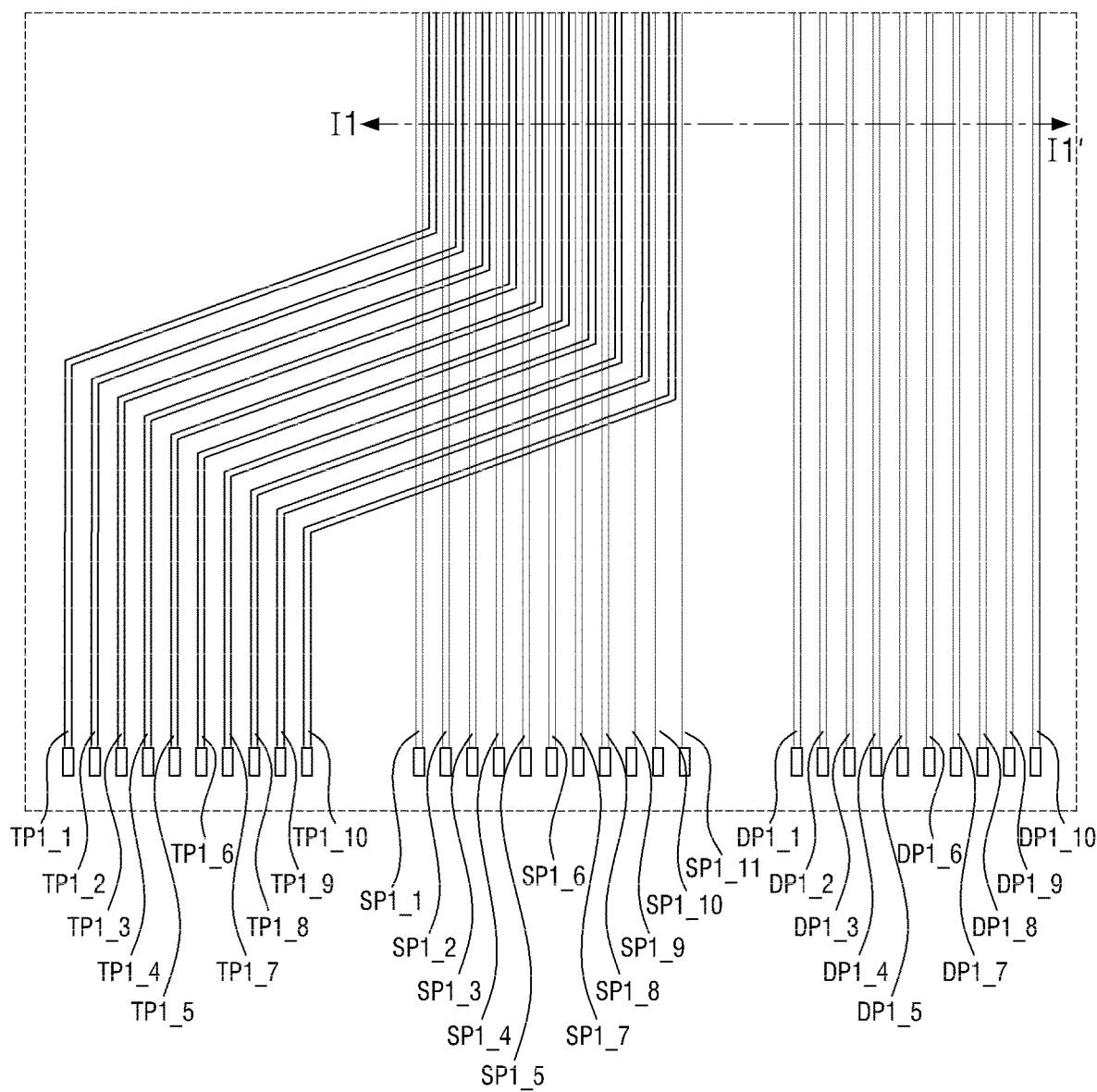
FIG. 4 is an enlarged view of portion FF1 of FIG. 3.
Figure 5:
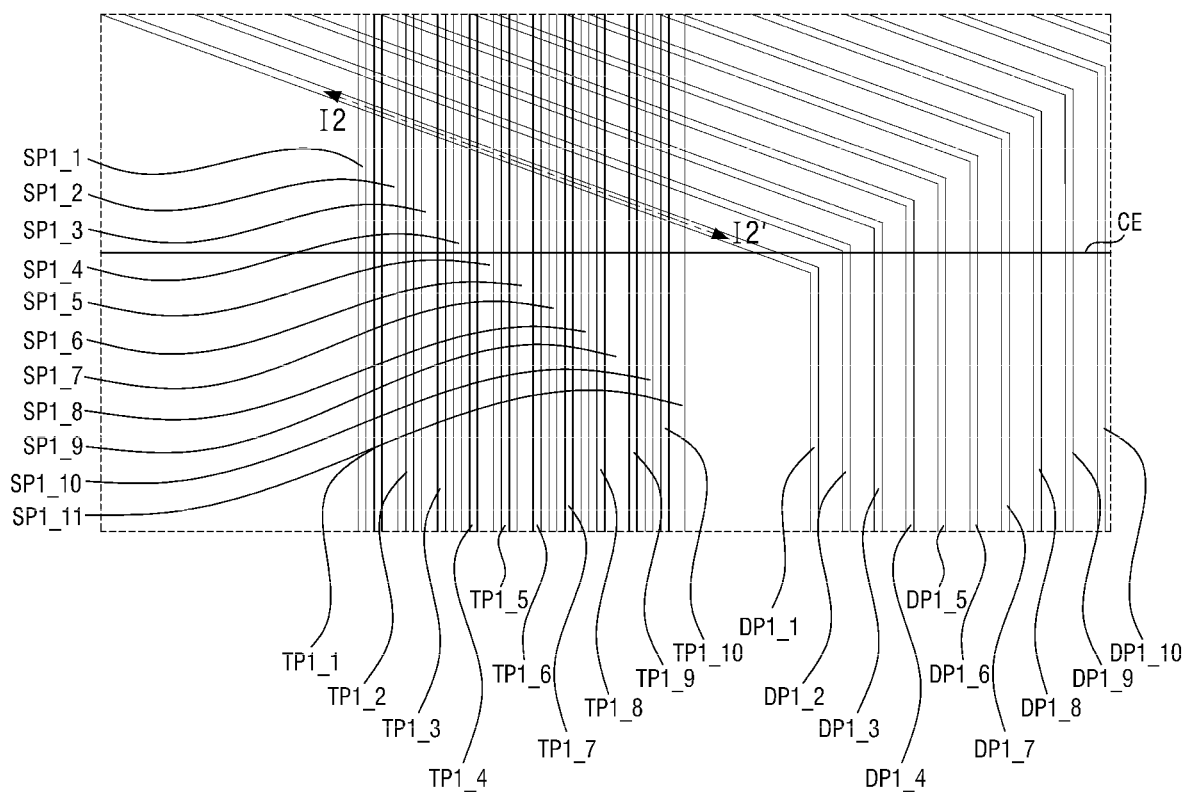
FIG. 5 is an enlarged view of portion FF2 of FIG. 3.
Figure 6:
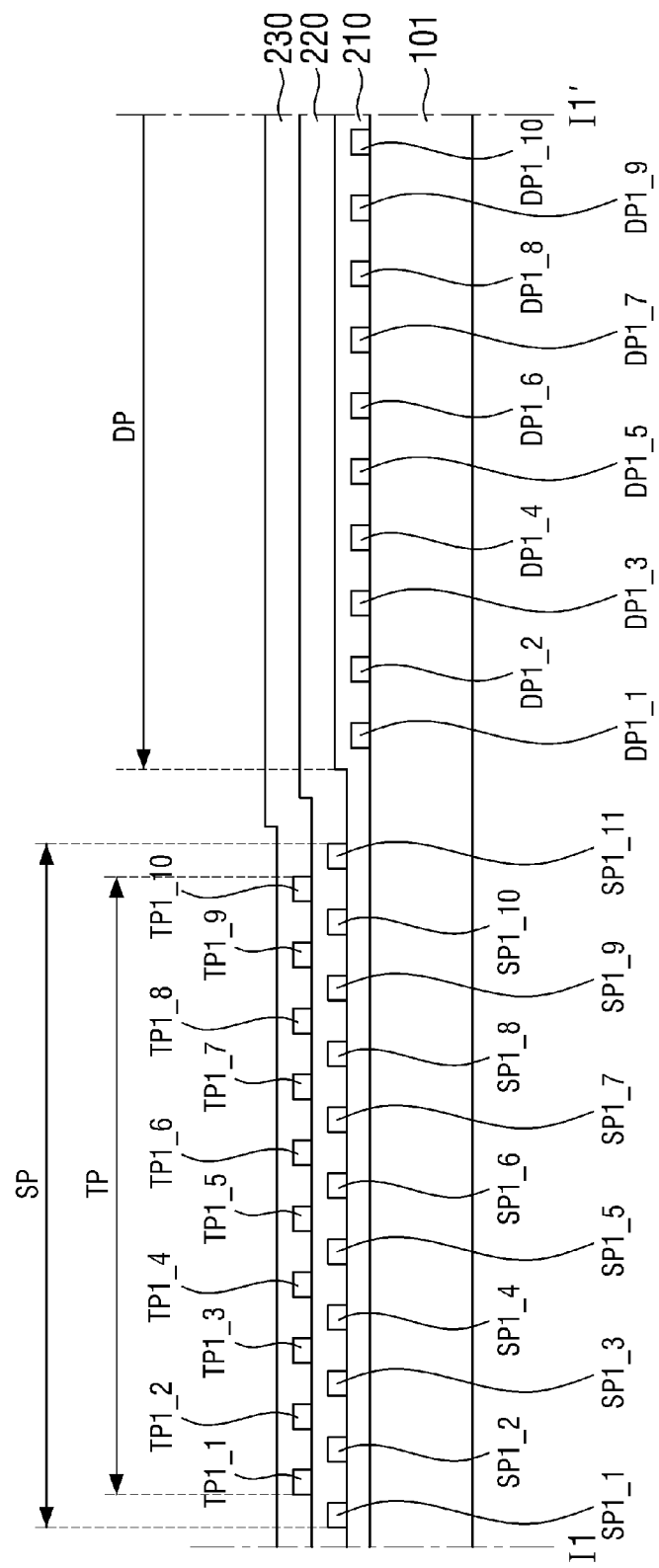
FIG. 6 is a cross-sectional view taken along line I1-I1' of FIG. 4.
Figure 7:
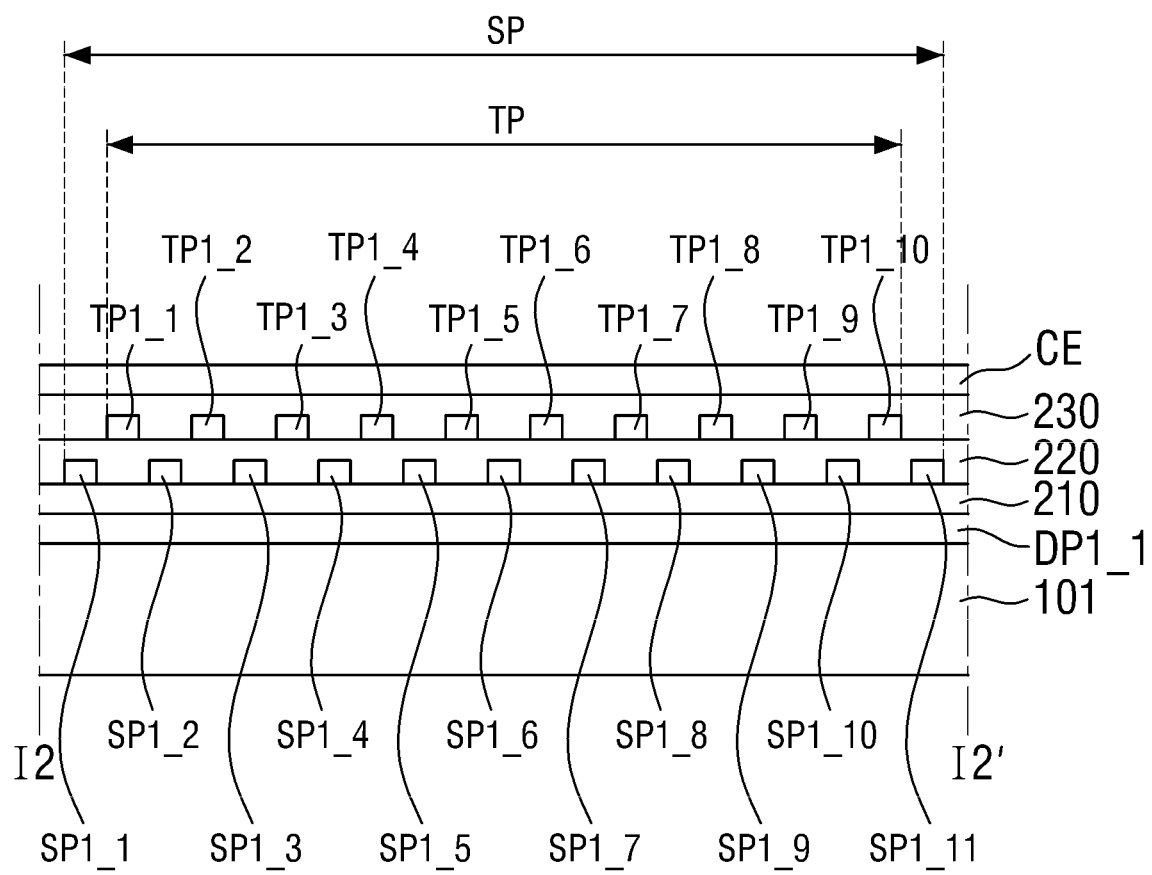
FIG. 7 is a cross-sectional view taken along line I2-I2' of FIG. 5.

FIG. 3 is a view showing a layout of the portion 10a of the display panel of FIG. 1 in more detail. FIG. 4 is an enlarged view of portion FF1 of FIG. 3. FIG. 5 is an enlarged view of portion FF2 of FIG. 3. FIG. 6 is a cross-sectional view taken along line I1-I1' of FIG. 4. FIG. 7 is a cross-sectional view taken along line I2-I2' of FIG. 5.

Referring to FIGS. 3 to 7, the display panel 10 may include a plurality of touch lines TP, a plurality of power lines SP, and a plurality of data lines DP.

The display panel 10 includes a base substrate 101, first line layers DP1_1 to DP1_10 disposed on the base substrate 101, a first line insulating layer 210 disposed on the first line layers DP1_1 to DP1_10, second line layers SP1_1 to SP1_11 disposed on the first line insulating layer 210, a second line insulating layer 220 disposed on the second line layers SP1_1 to SP1_11, third line layers TP1_1 to TP1_10 disposed on the second line insulating layer 220, and a third line insulating layer 230 disposed on the third line layers TP1_1 to TP1_10. A buffer layer or another insulating layer may be further disposed between the base substrate 101 and the first line layers DP1_1 to DP1_10.

Each of the touch lines TP, each of the power lines SP and each of the data lines DP may be extended from the respective pad terminals included in the pad unit PD. The pad unit PD may be disposed in the vicinity of one edge of the display panel 10 in the second direction dr2. In an exemplary embodiment, the pad unit PD may be disposed at the outermost side in the second direction dr2 and may include pad terminals connected to the touch lines TP. In addition, the pad unit PD may include pad terminal connected to the power lines SP and pad terminals connected to the data lines DP toward the inside.

The plurality of signal lines extended from the pad terminals may be extended generally in the second direction dr2. On the other hand, among the plurality of signal lines extended from the pad terminals, the touch lines TP and the power lines SP may be arranged so as to generally overlap with one another and may be extended in the second direction dr2. The touch lines TP and the power lines SP may be insulated from one another where they overlap with one another. The touch lines TP and the power lines SP may overlap with one another in the sub-region SR and the panel bending region BD of the display panel 10.

The pad terminals may be are spaced apart from one another in the first direction dr1. The touch lines TP and the power lines SP may be parallel to one another where they are extended from the pad terminals. In order to dispose the touch lines TP and the power lines SP so that they generally overlap with one another, the touch lines TP may include bent portions toward the power lines SP.

Specifically, the plurality of signal lines may include a first touch line unit TP1 disposed on one side in the first direction dr1, adjacent to the pad unit PD in the second direction dr2. The plurality of signal lines may include a first power line unit SP1, a first data line unit DP, a second touch line unit TP2, and a second power line unit SP2 spaced apart from the first touch line unit TP1 in the first direction dr1 in this order.

The pad terminals may be formed on the same layer. The signal lines may be electrically connected to the first line layers DP1_1 to DP1_10 to the third line layers TP1_1 to TP1_10 through the pad terminals and the contact holes. For example, the data lines DP may be connected to the first line layers DP1_1 to DP1_10 through the contact holes, the power lines SP may be connected to the second line layers SP1__1 to SP1_11 through the contact holes, and the touch lines TP may be connected to the third line layers TP1_1 to TP1_10 through the contact holes.

The first line layers DP1_1 to DP1_10 to the third line layers TP1_1 to TP1_10 are sequentially stacked from the base substrate 101 and may include an insulating layer between every two of the line layers. In other exemplary embodiments, the first line layers DP1_1 to DP1_10 may be formed on the same layer as the pad terminals. In such case, they may be connected directly to the pad terminals without passing through the contact holes.

The first touch line unit TP1 may include a portion overlapping with the first power line unit SP1. The second touch line unit TP2 may include a portion overlapping with the second power line unit SP2 and may be continuously extended in the second direction dr2 so as to include a portion overlapping with a common electrode CE disposed in the main region MR.

The lines of the touch line unit TP extended in the second direction dr2 may fan out where they overlap with the common electrode CE in the non-display area NDA. In each of the first and second touch line units TP1 and TP2, the number of lines TP1a and TP2a that fan out toward one side in the first direction dr1 may be equal to the number of lines TP1b and TP2b and fan out toward the opposite side in the first direction dr1, respectively.

In the example shown in FIG. 4 where the first touch line unit TP1 includes the first to tenth touch lines TP1_1 to TP1_10, the touch lines TP are extended from the respective pad terminals in the second direction dr2, include a portion that is bent such that they overlap with the first power line unit SP1, and are extended in the second direction dr2 where they overlap with the first power line unit SP1. The touch lines TP may be extended in the second direction dr2 until they reach the common electrode CE disposed in the main region. The first to fifth touch lines TP1_1 to TP1__5 may be extended beyond one edge of the common electrode CE to be extended in the second direction dr2 and may fan out generally toward one side in the first direction dr1. The sixth to tenth touch lines TP1__6 to TP1_10 may be extended beyond one edge of the common electrode CE to be extended in the second direction dr2 and may fan out generally toward the opposite side in the first direction dr1. The distance TPW1 between the first touch line TP1_1 and one edge of the common electrode CE may be equal to the distance TPW2 between the tenth touch line TP1_10 and the edge of the common electrode CE. In an exemplary embodiment, the distances TPW1 and TPW2 may be equal to or greater than 72 μm.

As the touch line unit TP fans out as described above, the distance between the edge of the common electrode CE and the fan-out touch line unit TP can be reduced. As a result, the dead space of the organic light-emitting display device 1 can be reduced.

The third line layer TP1_1 to TP1_10 may be formed of indium-tin-oxide (ITO), indium zinc oxide (IZO), zinc oxide (ZnO), indium oxide (In$_2$O$_3$), indium gallium oxide (IGO), aluminum zinc oxide (AZO), silver (Ag), magnesium (Mg), aluminum (Al), platinum (Pt), palladium (Pd), gold (Au), nickel (Ni), neodymium (Nd), iridium (Jr), chromium (Cr), calcium (Ca), silicon (Si), sodium (Na), tungsten (W), or combinations thereof. In an exemplary embodiment, the third line layers TP1_1 to TP1_10 may include the respective touch line units TP.

The lines of the power line unit SP may be extended from the respective pad terminals in the second direction dr2 in the sub-region SR and the panel bending region BD and may be electrically connected to a first pixel electrode 121 (see FIG. 9) and a second pixel electrode 123 (see FIG. 9) of each pixel in the main region to supply voltage signal. The second pixel electrode 123 may be electrically connected to an electrode of the light-emitting element.

The power line unit SP may overlap with the touch line unit TP in a certain region, where the power line layer SP may be disposed between the data line layer DP and the touch line layer TP. An insulating layer may be disposed among the data line DP layer, the power line SP layer and the touch line layer TP so that they are insulated from one another. The power line unit SP may be used to reduce the influence by a noise signal generated in the data lines DP on the touch lines TP and the influence by a noise signal generated in the touch lines TP on the data lines DP.

The second line layers SP1_1 to SP1_11 may be formed of an appropriate conductive material such as molybdenum (Mo), nickel (Ni), chromium (Cr), tungsten (W), silver (Ag), gold (Au), titanium (Ti), copper (Cu), aluminum (Al) and neodymium (μl-Nd), or an alloy thereof, and may be made up of a dual layer including Mo/Al-μl-Nd, Mo/Al, Ti/Al, etc., and a multi-layer structure such as Mo/Al/Mo, Mo/Al-μl-Nd/Mo, Ti/Al/Ti and Ti/Cu/Ti. Furthermore, the second line layers SP1_1 to SP1_11 may be formed of silver nanowire. In an exemplary embodiment, the second line layers SP1_1 to SP1_11 may include respective power line units SP. In an exemplary embodiment, the data line unit DP may be disposed more to the inside than the touch line unit TP and the power line unit SP when viewed from the top, i.e., further from the edge of display device 1. The data line unit DP may be extended from the pad terminals in the second direction dr2, and the data line unit DP continuously extended in the second direction dr2 may fan out where it overlaps with the common electrode CE in the non-display area NDA. The data line unit DP may include a portion overlapping with the touch line unit TP and the power line unit SP where it fans out. In an exemplary embodiment, the data line unit DP may be disposed on the lowest layer, i.e., closer to the substrate than the touch line unit TP and the power line unit SP.

The data lines DP may be electrically connected to the transistors of each pixel disposed in the display area DA to provide data signal.

The data line unit DP may be formed as a single-layer, a dual-layer or a triple-layer made of a conductive metal selected from the group consisting of aluminum (Al), copper (Cu), molybdenum (Mo), chrome (Cr), titanium (Ti), tungsten (W), molybdenum-tungsten (MoW), molybdenum-titanium (MoTi) and copper/molybdenum-titanium (Cu/MoTi). It is, however, to be understood that the present disclosure is not limited thereto. the data line unit DP may be made of a variety of metals or conductors.

The common electrode CE may be formed throughout the entire display area DA and may be extended beyond the display area DA to the non-display area NDA. One edge of the common electrode CE may be located in the main region MR of the display panel 10 adjacent to the boundary between the main region MR and the panel bending region BD.

The common electrode CE may be formed so that it covers the fan-out portion of the power line unit SP and the fan-out portion of the data line unit DP. Accordingly, the common electrode CE may suppress the influence by a noise signal generated in the fan-out portion of the power line unit SP and the fan-out portion of the data line unit DP on other elements.

Although the first to tenth touch lines TP1_1 to TP1_10 do not entirely overlap with the respective power lines SP1__1 to SP1_11 of the power line unit SP in the drawings, the present disclosure is not limited thereto. It is to be understood that the region where the touch line unit TP are disposed may include the region overlapping with the region where the power lines SP are formed. In other exemplary embodiments, the first to tenth touch lines TP1_1 to TP1_10 may be formed so as to overlap with the power lines SP1__1 to SP1_11 of the power line unit SP, respectively. The numbers of the signal lines are not limited to those shown in the drawings but may be different.

Figure 8:
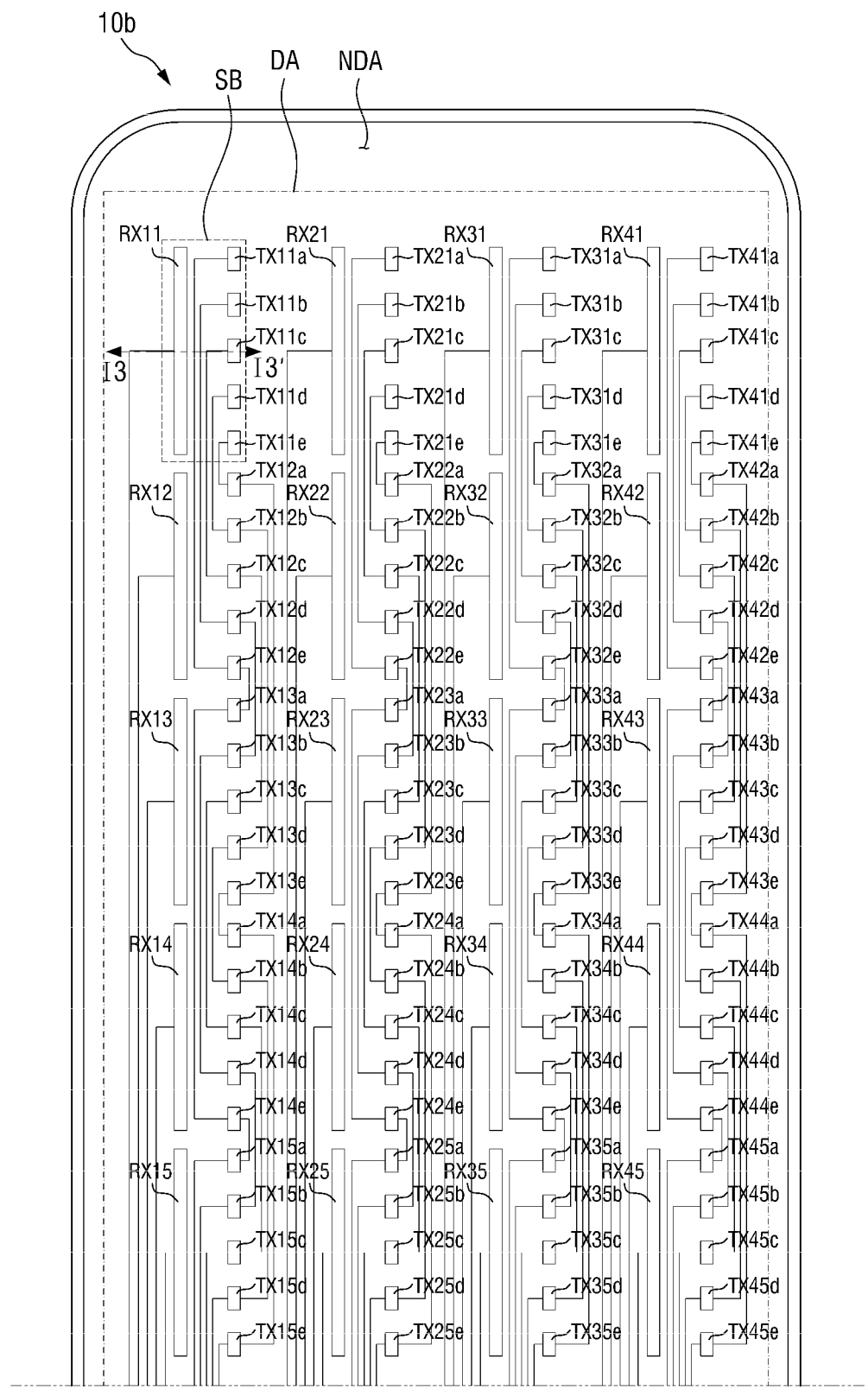
FIG. 8 is a view showing a layout of portion 10b of the display panel of FIG. 1 in more detail.
Figure 9:
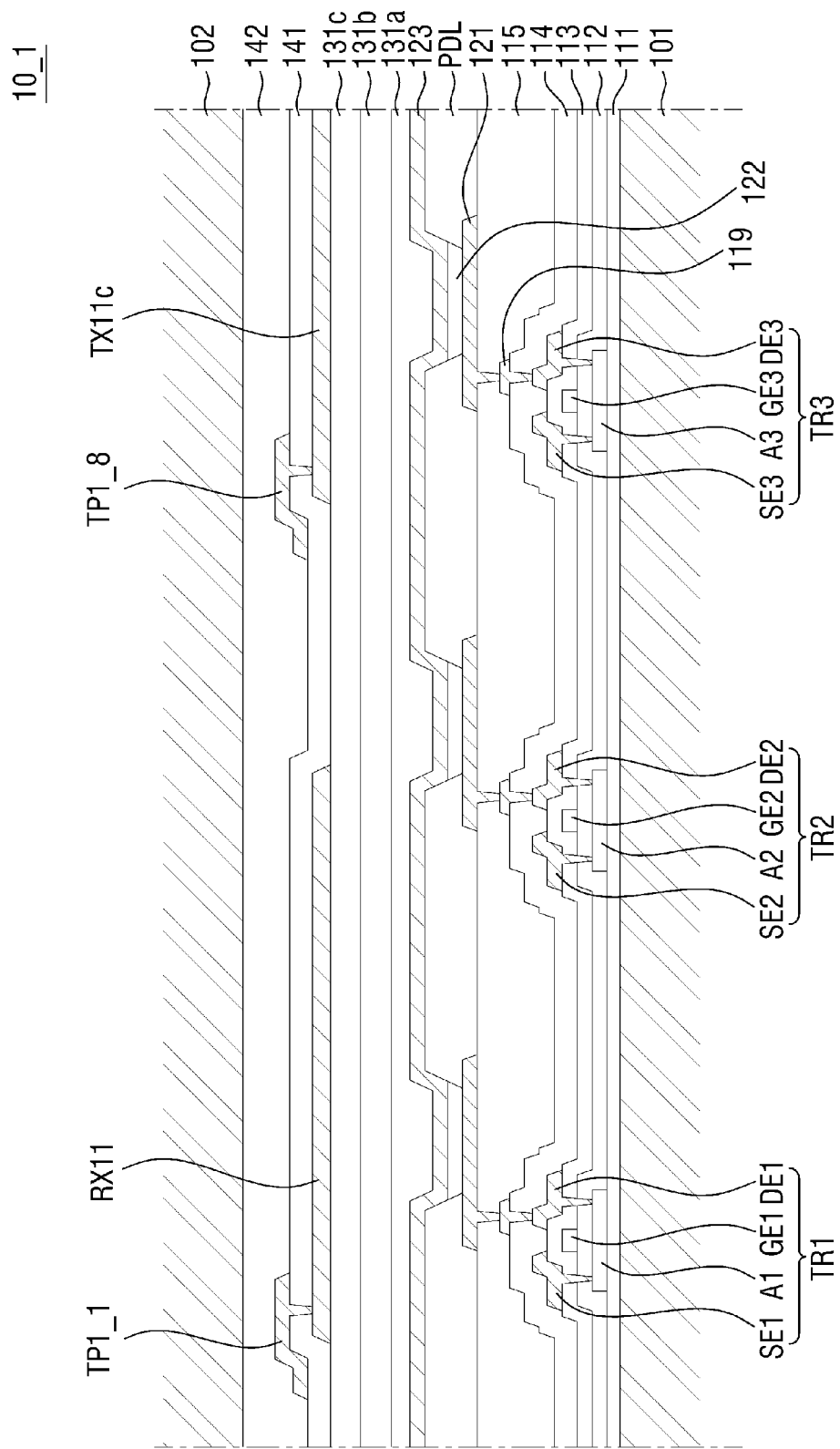
FIG. 9 is a cross-sectional view of the organic light-emitting display device, taken along line I3-I3' of FIG. 8.

FIG. 8 is a view showing a layout of portion 10b of the display panel of FIG. 1 in more detail. FIG. 9 is a cross-sectional view of the organic light-emitting display device, taken along line I3-I3' of FIG. 8.

Referring to FIGS. 8 and 9, an organic light-emitting display device 1 includes at least one base substrate 101. For example, the organic light-emitting display device 1 may include a second substrate 102 facing the base substrate 101. It is, however, to be understood that the present disclosure is not limited thereto. The second substrate 102 may be eliminated or replaced with another structure such as a film or a layer.

The base substrate 101 may be a flexible substrate. For example, the base substrate 101 may be a film substrate including a polymer organic substance or a plastic substrate. For example, the base substrate 101 may be formed of a material selected from the group consisting of: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. In addition, the base substrate 101 may include fiberglass reinforced plastic (FRP). It is, however, to be understood that the present disclosure is not limited thereto. The base substrate 101 may be a rigid substrate. Herein, the base substrate 101 may be one of a glass substrate, a quartz substrate, a glass ceramic substrate, and a crystalline glass substrate.

A plurality of pixels, input sensing units and signal lines may be disposed on the base substrate 101, whereby that the base substrate 101 may include the display area DA and the non-display area NDA.

A buffer layer 111 is disposed on the base substrate 101. The buffer layer 111 smoothens the surface of the base substrate 101 and prevents the permeation of moisture or external air. The buffer layer 111 may be an inorganic layer. The buffer layer 111 may be made up of a single layer or multiple layers.

On the buffer layer 111, a plurality of thin-film transistors TR1, TR2 and TR3 is disposed. The plurality of thin-film transistors TR1, TR2 and TR3 may be driving thin-film transistors. At least one of the thin-film transistors TR1, TR2 and TR3 may be disposed in each of the pixels. The thin-film transistors TR1, TR2 and TR3 may include semiconductor layers A1, A2 and A3, gate electrodes GE1, GE2 and GE3, source electrodes SE1, SE2 and SE3, and drain electrodes DE1, DE2 and DE3, respectively.

More specifically, the semiconductor layers A1, A2 and A3 are disposed on the buffer layer 111. The semiconductor layers A1, A2 and A3 may include amorphous silicon, poly silicon, and an organic semiconductor. In another exemplary embodiment, the semiconductor layers A1, A2 and A3 may be oxide semiconductors. Although not shown in the drawings, the semiconductor layer A1, A2 and A3 may include a channel region, and a source region and a drain region which are disposed on the sides of the channel region, respectively, and are doped with impurities.

A first conductive layer is disposed on the gate insulating layer 112. The first conductive layer may include gate electrodes GE1, GE2 and GE3. The gate electrodes GE1, GE2 and GE3 may be formed of a conductive metal material. For example, the gate electrodes GE1, GE2 and GE3 may include molybdenum (Mo), aluminum (Al), copper (Cu) and titanium (Ti). The gate electrodes GE1, GE2 and GE3 may be made of a single layer or multiple layers.

A first interlayer dielectric layer 113 is disposed on the first conductive layer. The first interlayer dielectric layer 113 may be an inorganic layer. The first interlayer dielectric layer 113 may be made up of a single layer or multiple layers.

A first conductive layer is disposed on the gate insulating layer 112. The second conductive layer may include source electrodes SE1, SE2 and SE3 and drain electrodes DE1, DE2 and DE3. The source electrodes SE1, SE2 and SE3 and the drain electrodes DE1, DE2 and DE3 are formed of a conductive metal material. The source electrodes SE1, SE2 and SE3 and the drain electrodes DE1, DE2 and DE3 may be in the same layer as the first line layers DP1_1 to DP1_10 and may be formed of the same material. The second conductive layer and the first line layers DP1_1 to DP1_10 may be formed together via the same masking process.

The source electrodes SE1, SE2 and SE3 and the drain electrodes DE1, DE2 and DE3 may be electrically connected to the source regions and the drain regions of the semiconductor layers A1, A2 and A3, respectively, through contact holes that pass through the interlayer dielectric layer 113 and the gate insulating layer 112.

Although not shown in the drawings, the organic light-emitting display device 1 may further include a storage capacitor and a switching thin-film transistor on the buffer layer 111.

A second interlayer dielectric layer 114 is disposed on the second conductive layer. The second interlayer dielectric layer 114 may be an inorganic layer. The second interlayer dielectric layer 114 may be made up of a single layer or multiple layers.

A third conductive layer is disposed on the second interlayer dielectric layer 114. The third conductive layer may include a connection electrode 119 connecting the second conductive layer with a first pixel electrode 121 to be described later. The connection electrode 119 may be electrically connected to the drain electrodes DE1, DE2, DE3 (or the source electrodes SE1, SE2, SE3) through via holes passing through the second interlayer dielectric layer 114. The third conductive layer may be formed of the same material as the second conductive layer or may be formed of one of the above-listed materials or a combination thereof.

In another exemplary embodiment, the third conductive layer and the second interlayer dielectric layer 114 may be eliminated. In such case, the first conductive layer may be electrically connected directly to the first pixel electrode 121.

In another exemplary embodiment, the third conductive layer may be in the same layer as the first line layers DP1_1 to DP1_10 described above.

A protective layer 115 is disposed on the third conductive layer. The protective layer 115 is disposed to cover the pixel circuitry including the thin-film transistors TR1, TR2 and TR3. The protective layer 115 may be a passivation layer or a planarizing layer. The passivation layer may include $SiO_2$, $SiN_x$, etc., and the planarization layer may include materials such as acrylic and polyimide. The protective layer 115 may include both the passivation layer and the planarization layer. In such case, a passivation layer may be disposed on the third conductive layer, and a planarization layer may be disposed on the passivation layer.

A plurality of first pixel electrodes 121 is disposed on the protective layer 115. Each of the first pixel electrodes 121 may be the anode electrode of an organic light-emitting diode disposed in each pixel.

The second interlayer dielectric layer 114 and/or the protective layer 115 may form the above-described first line insulating layer 210. The first line insulating layer 210 may have the same material and the same stack structure as the second interlayer dielectric layer 114 and/or the protective layer 115.

The first pixel electrodes 121 may be electrically connected to the connection electrode 119 through a via hole passing through the passivation layer 115.

The first pixel electrodes 121 may be made of a material having a high work function. The first pixel electrodes 121 may include indium-tin-oxide (ITO), indium-zinc-oxide (IZO), zinc oxide (ZnO), indium oxide ($In_2O_3$), etc. The above-listed conductive materials have a relatively high work function and are transparent. When the organic light-emitting display device is a top-emission organic light-emitting display device, the first pixel electrodes 121 may further include a reflective material such as silver (Ag), magnesium (Mg), aluminum (Al), platinum (Pt), palladium (Pb), gold (Au), nickel (Ni), neodymium (Nd), iridium (Jr), chrome (Cr), lithium (Li), calcium (Ca) or a combination thereof, in addition to the above-listed conductive materials. Accordingly, the first pixel electrodes 121 may have a single-layer structure including the above-listed conductive material and the reflective material, or may have a multi-layer structure in which the single layers are stacked on one another.

A pixel-defining layer PDL is disposed over the first pixel electrodes 121. The pixel-defining layer PDL includes a plurality of openings. At least a part of each of the first pixel electrodes 121 is exposed via the respective openings. The pixel-defining layer PDL may include an organic material or an inorganic material. In an exemplary embodiment, the pixel-defining layer PDL may include a material such as a photoresist, a polyimide resin, an acrylic resin, a silicon compound and a polyacrylic resin.

An organic emission layer 121 is disposed on the first electrode 122 exposed by the pixel defining layer PDL.

A second pixel electrode 122 is disposed on the organic emission layer 123. The second pixel electrode 123 may be a common electrode extended across all the pixels. In addition, the second pixel electrode 123 may work as the cathode electrodes of organic light-emitting diode.

The second pixel electrode 123 may be made of a material having a low work function. The second pixel electrode 123 may include Li, Ca, LiF/Ca, LiF/Al, Al, Mg, Ag, Pt, Pd, Ni, Au, Nd, Ir, Cr, BaF, Ba, or a compound or mixture thereof, e.g., a mixture of Ag and Mg. The second pixel electrode 123 may further include an auxiliary electrode. The auxiliary electrode may include a layer formed by depositing the material, and a transparent metal oxide on the layer such as indium-tin-oxide (ITO), indium-zinc-oxide (IZO), zinc oxide (ZnO) and indium-tin-zinc-oxide (ITZO).

When the organic light-emitting display device 1 is a top-emission organic light-emitting display device, a thin conductive layer having a small work function may be formed as the second pixel electrode 123, and a transparent conductive layer such as indium-tin-oxide (ITO) layer, an indium-zinc-oxide (IZO) layer, a zinc oxide (ZnO) layer and an indium oxide ($In_2O_3$) layer may be formed thereon.

The above-described first pixel electrodes 121, the organic emission layer 122 and the second electrode 123 may form an organic light-emitting diode.

The first pixel electrodes 121 and the second pixel electrode 123 may be electrically connected to the power line unit SP. The power line unit SP may be formed, but is not limited to being, on the same layer as the first pixel electrodes 121 or the second pixel electrode 123.

On the second pixel electrode 123, encapsulation layers 131a, 131b and 131c are disposed. The encapsulation layers 131a, 131b and 131c include inorganic layers. The encapsulation layers 131a, 131b, and 131c may include a stack of layers. Although not shown in the drawings, the encapsulation layers 131a, 131b and 131c may be made up of multiple layers including a first inorganic layer 131a, an organic layer 131b, and a second inorganic layer 131c which are stacked on one another in this order. The first inorganic layer 131a and the second inorganic layer 131c may include one or more selected from the group consisting of: silicon oxide (SiOx), silicon nitride (SiNx) and silicon oxynitride (SiONx). The organic layer 131b may include one selected from the group consisting of epoxy, acrylate and urethane acrylate.

An input sensing layer is disposed on the encapsulation layers 131a, 131b and 131c. The encapsulation layers 131a, 131b and 131c may be in contact with the input sensing layer. The input sensing layer may include an input sensing unit for sensing a user's touch input. Hereinafter, the input sensing unit will be described in detail.

The input sensing unit includes a plurality of first sensing electrodes RX, a plurality of second sensing electrodes TX, and a plurality of touch lines TP. The first sensing electrodes RX may be sensing electrodes or driving electrodes, while the second sensing electrodes TX may be driving electrodes or sensing electrodes. For example, in an exemplary embodiment, the first sensing electrodes RX may be sensing electrodes and the second sensing electrodes TX may be driving electrodes.

The input sensing unit includes a plurality of sensor blocks SB arranged in the display area DA. The sensor blocks SB may define a plurality of sensor rows or a plurality of sensor rows. The plurality of sensor columns may be arranged in the second direction dr2. The plurality of sensor columns may be arranged in the first direction dr1. For the sake of clarity, only the sensor block SB in the first column and the first row is labeled in the drawing.

Each of the plurality of sensor blocks SB includes a first sensing electrode RX11 and i second sensing electrodes TX adjacent to the first sensing electrode RX11 and arranged in a predetermined direction, where i is a natural number equal to or greater than two. In the example shown in FIG. 8, i is five, i.e., five second sensing electrodes TX11a to TX11e are shown. The i second sensing electrodes TX11a to TX11e form one sensor group. The second sensing electrodes TX11a to TX11e may be arranged in the substantially the same direction as the direction in which first sensing electrode RX11 is extended.

When the second sensing electrodes TX11a to TX11e receive a detection signal (or a transmission signal) for detecting an external input, the first sensing electrode RX11 may be capacitively coupled with the second sensing electrodes TX11a to TX11e. When an input means is placed on one second sensing electrode TX among the capacitively-coupled second sensing electrodes TX11a to TX11e, the capacity between the first sensing electrode RX and the second sensing electrode TX may be changed. The input sensing circuit (not shown) may calculate the coordinate information of the input means by detecting the changed capacity from the second sensing electrode TX. In an exemplary embodiment, the first sensing electrode RX may receive a detection signal for detecting an external input. The input sensing circuit may detect the changed capacity from the second sensing electrode TX to calculate the coordinate information of the input means.

The connective relationship between the plurality of sensor blocks SB and the plurality of touch line units TP will be described. The connective relationship between the plurality of sensor blocks SB and the plurality of touch line units TP will be described with reference to the first sensor row.

The touch line units TP may include a plurality of first sub-line units and a plurality of second sub-line units. The first sub-line units are connected to the first sensing electrodes RX11 to RX15 of the sensor blocks SB of the first sensor row ISC1, respectively. The first sub-line units may be the first to fifth touch lines TP1_1 to TP1_5 described above.

The second sub-line units are used to connect the $j^{th}$ one of the i second sensing electrodes TX11 to TX15 at the $n^{th}$ sensor block among the sensor blocks SB at the sensor column, with the $(i-j+1)^{th}$ one of the i second sensing electrode TX11 to TX15 at the $(n+1)^{th}$ sensor block, where j is a natural number equal to or greater than one and equal to or less than i. Hereinafter, a detailed description will be made with reference to five second sub-line units at the first sensor column.

One of the second sub-line units connects the first one of the second sensing electrodes TX11a of the first sensor block SB, the fifth one of the second sensing electrodes TX12e of the second sensor block SB, the first one of the second sensing electrodes TX13a of the third sensor block SB, the fifth one of the second sensing electrodes TX14e of the fourth sensor block SB, and the first one of the second sensing electrodes TX15a of the fifth sensor block SB.

Another of the second sub-line units is used to connect the second one of the second sensing electrodes TX11b of the first sensor block SB, the fourth one of the second sensing electrodes TX12d of the second sensor block SB, the second one of the second sensing electrodes TX13b of the third sensor block SB, the fourth one of the second sensing electrodes TX14b of the fourth sensor block SB, and the second one of the second sensing electrodes TX15b of the fifth sensor block SB.

Yet another of the second sub-line units is used to connect the third one of the second sensing electrode TX11c to TX15c at the first to fifth sensor blocks.

Yet another of the second sub-line units is used to connect the fourth one of the second sensing electrodes TX11d of the first sensor block SB, the second one of the second sensing electrodes TX12b of the second sensor block SB, the fourth one of the second sensing electrodes TX13d of the third sensor block SB, the second one of the second sensing electrodes TX14b of the fourth sensor block SB, and the fourth one of the second sensing electrodes TX15d of the fifth sensor block SB.

Yet another of the second sub-line units is used to connect the fifth one of the second sensing electrodes TX11e of the first sensor block SB, the first one of the second sensing electrodes TX12a of the second sensor block SB, the fifth one of the second sensing electrodes TX133 of the third sensor block SB, the first one of the second sensing electrodes TX14a of the fourth sensor block SB, and the fifth one of the second sensing electrodes TX15e of the fifth sensor block SB.

The second sub-line units may be the sixth to tenth touch lines TP1_6 to TP1_10 described above.

The input sensing layer includes sensing electrode layers RX and TX, a first sensing insulating layer 141 disposed on the sensing electrode layers RX and TX, a touch line layer TP disposed on the first sensing insulating layer 141, and a second sensing insulating layer 142 disposed on the touch line layer TP.

According to an exemplary embodiment of the present disclosure, the sensing electrode layers RX and TX may be disposed directly on the encapsulation layers 131a, 131b, and 131c. It is, however, to be understood that the present disclosure is not limited thereto. According to another exemplary embodiment of the present disclosure, a base may be interposed between the encapsulation layers 131a, 131b and 131c and the sensing electrode layers RX and TX. The base 7111 may be made of, for example, glass or plastic such as polyethylene terephthalate (PET), polyimide (PI), polycarbonate (PC), polyethylene (PE), polypropylene (PP), polysulfone (PSF), polymethylmethacrylate (PMMA), triacetylcellulose (TAC) and cycloolefin polymer (COP).

The sensing electrode layers RX and TX may be made of a conductive material. The sensing electrode layers RX and TX may include a transparent conductive oxide such as indium tin oxide (ITO), indium zinc oxide (IZO), zinc oxide (ZnO) and indium tin zinc oxide (ITZO).

The first sensing insulating layer 141 may include a silicon compound, a metal oxide, etc. The first sensing insulating layer 141 may include a contact hole via which a part of the sensing electrode layers is exposed.

The touch line layer TP may be electrically connected directly to the sensing electrode layers through the contact hole passing through the first sensing insulating layer 141.

The second sensing insulating layer 142 may include the same material as the first sensing insulating layer 141. In another exemplary embodiment, the second sensing insulating layer 142 may be eliminated.

The first sensing insulation layer 141 and/or the encapsulation layers 131a, 131b and 131c may form the second line insulating layer 220, and the second sensing insulating layer 142 may form the third line insulating layer 230.

The second substrate 102 may be disposed on the input sensing layer. The second substrate 102 may be implemented as a transparent substrate such as glass or plastic. The second substrate 102 may be a window substrate, a sealing substrate, or a protective substrate.

Although not shown in the drawings, an adhesive layer may be disposed between the input sensing layer and the second substrate 102. The adhesive layer is interposed between the input sensing layer and the second substrate 102 to couple the input sensing layer with the second substrate 102. The adhesive layer 150 may include a film having adhesiveness, e.g., optically clear adhesive (OCA). As another example, the adhesive layer may include an optically clear resin (OCR). The adhesive layer and the second substrate 102 may be eliminated in other implementations.

Hereinafter, an organic light-emitting display device according to another exemplary embodiment of the present disclosure will be described. The elements already described above with respect to FIGS. 1 to 9 will not be described again. In addition, like reference numerals may denote features analogous to those described above with reference to FIGS. 1 to 9.

Figure 10:
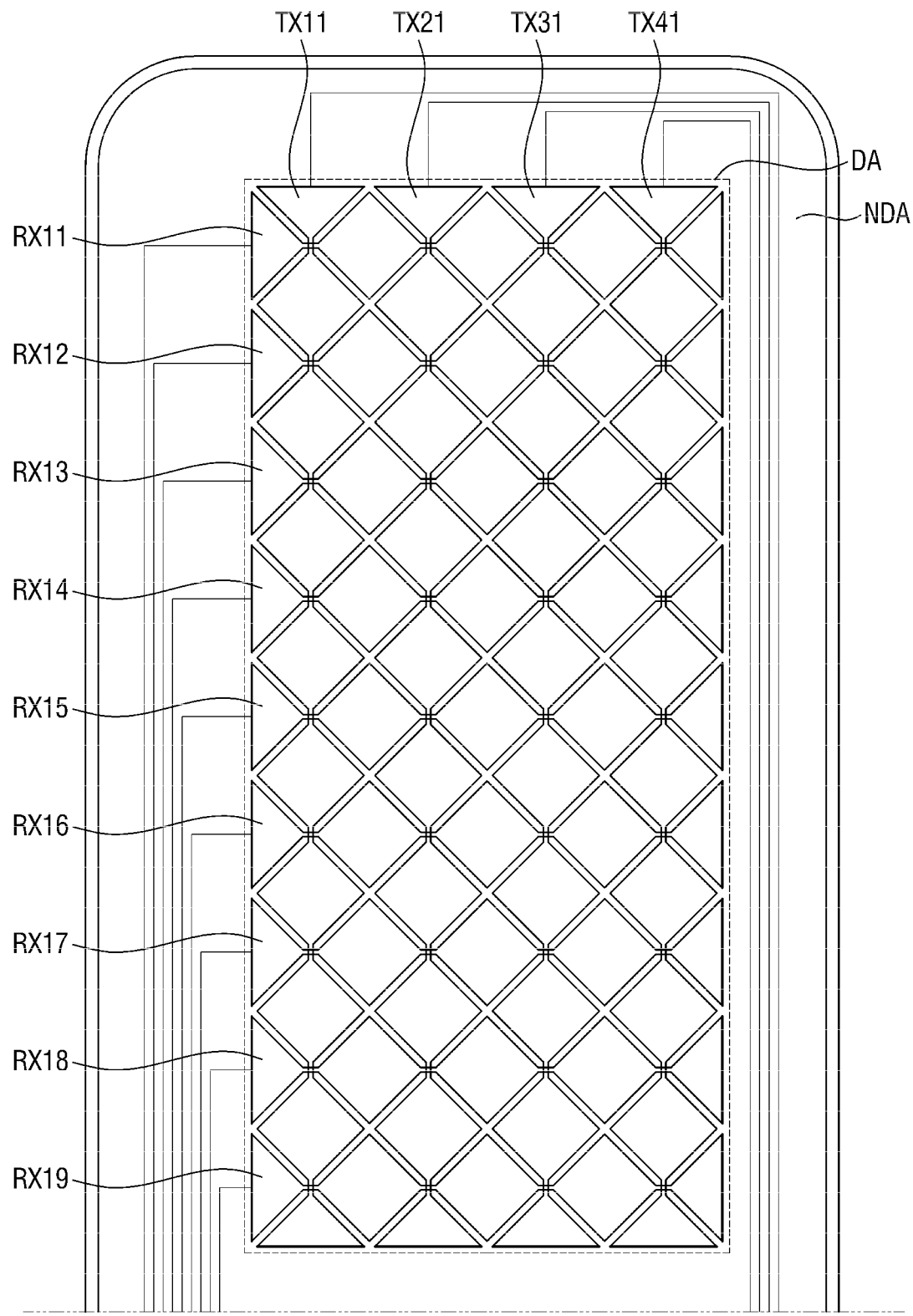
FIG. 10 is a view showing a layout of input sensing units of an organic light-emitting display device according to another exemplary embodiment of the present disclosure.

FIG. 10 is a view showing a layout of input sensing units of an organic light-emitting display device according to another exemplary embodiment of the present disclosure. FIG. 10 shows a modification of the exemplary embodiment shown in FIG. 8.

An organic light-emitting display device according to the exemplary embodiment shown in FIG. 10 is substantially identical to the organic light-emitting diode display device according to the exemplary embodiment shown in FIG. 8 except the shape and arrangement of the first sensing electrode RX and the second sensing electrode TX.

The input sensing unit may include a plurality of first sensing electrodes RX, a plurality of second sensing electrodes TX, and a touch line unit TP connected to the respective touch electrodes. The first sensing electrodes RX and the second sensing electrodes TX may acquire information of a position where a touch has been made by self-capacitance sensing and/or mutual-capacitance sensing.

The first sensing electrodes RX and the second sensing electrodes TX may be arranged in a matrix. Each of the first sensing electrodes RX and the second sensing electrodes TX may have, but is not limited to, a diamond shape. The first sensing electrodes RX may be electrically connected to one another in the first direction d1, and the second sensing electrodes TX may be electrically connected to one another in the second direction d2. It is, however, to be understood that the present disclosure is not limited thereto. The first sensing electrodes RX may be electrically connected to one another in the column direction, and the second sensing electrodes TX may be electrically connected to one another in the row direction. The first sensing electrodes RX and the second sensing electrodes TX are insulated from one another.

The first sensing electrodes RX and the second sensing electrodes TX may be arranged in the same layer. Each of the first sensing electrodes RX or the second sensing electrodes TX may be physically separated from an adjacent sensing electrode by the sensing electrode of the second sensing electrodes TX or the first sensing electrode RX. In such case, the sensing electrode adjacent to the other sensing electrode may be connected by a bridge electrode.

Figure 11:
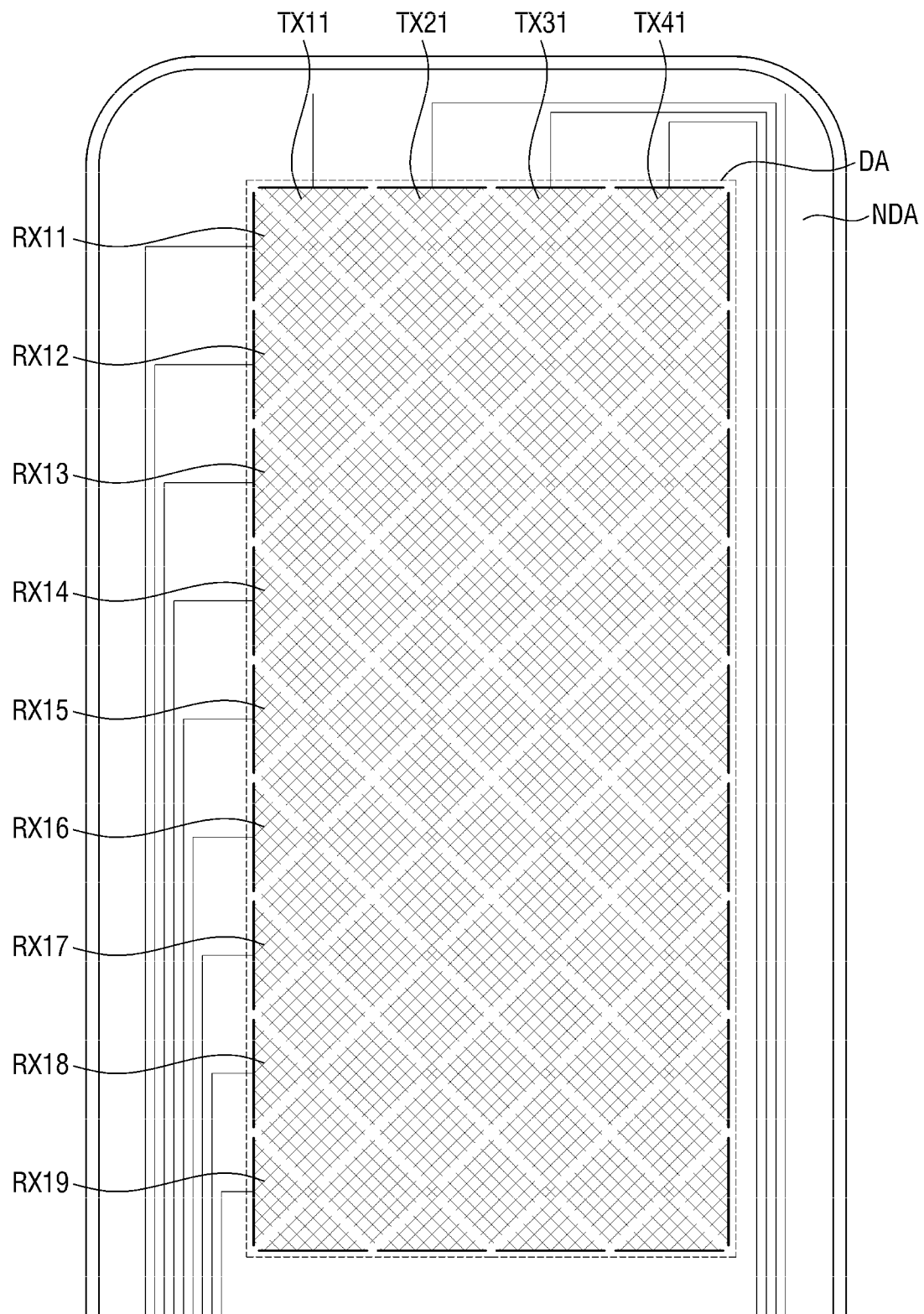
FIG. 11 is a view showing a layout of an input sensing unit of an organic light-emitting display device according to yet another exemplary embodiment of the present disclosure.

FIG. 11 is a view showing a layout of an input sensing unit of an organic light-emitting display device according to yet another exemplary embodiment of the present disclosure. FIG. 11 shows a modification of the exemplary embodiment shown in FIG. 8.

An organic light-emitting display device according to the exemplary embodiment shown in FIG. 11 is substantially identical to the organic light-emitting diode display device according to the exemplary embodiment shown in FIG. 8 except the shape and arrangement of the first sensing electrode RX and the second sensing electrode TX.

The first sensing electrodes RX and the second sensing electrodes TX may have a mesh shape. Since the first sensing electrodes RX and the second sensing electrodes TX have a mesh shape, the parasitic capacitance with the electrodes in the display area DA can be reduced. In addition, the first sensing electrodes RX and the second sensing electrodes TX may be disposed such that they overlap the pixel-defining layer PDL, and thus they may not be visible to a user who uses the organic light-emitting display device.

The first sensing electrodes RX and the second sensing electrodes TX in the mesh shape may include, but is not limited to, silver, aluminum, copper, chromium, nickel, titanium, etc. that can be processed at a low temperature. Accordingly, it is possible to prevent damage to the organic light-emitting display device even if the input sensing unit is formed via continuous processes.

Figure 12:
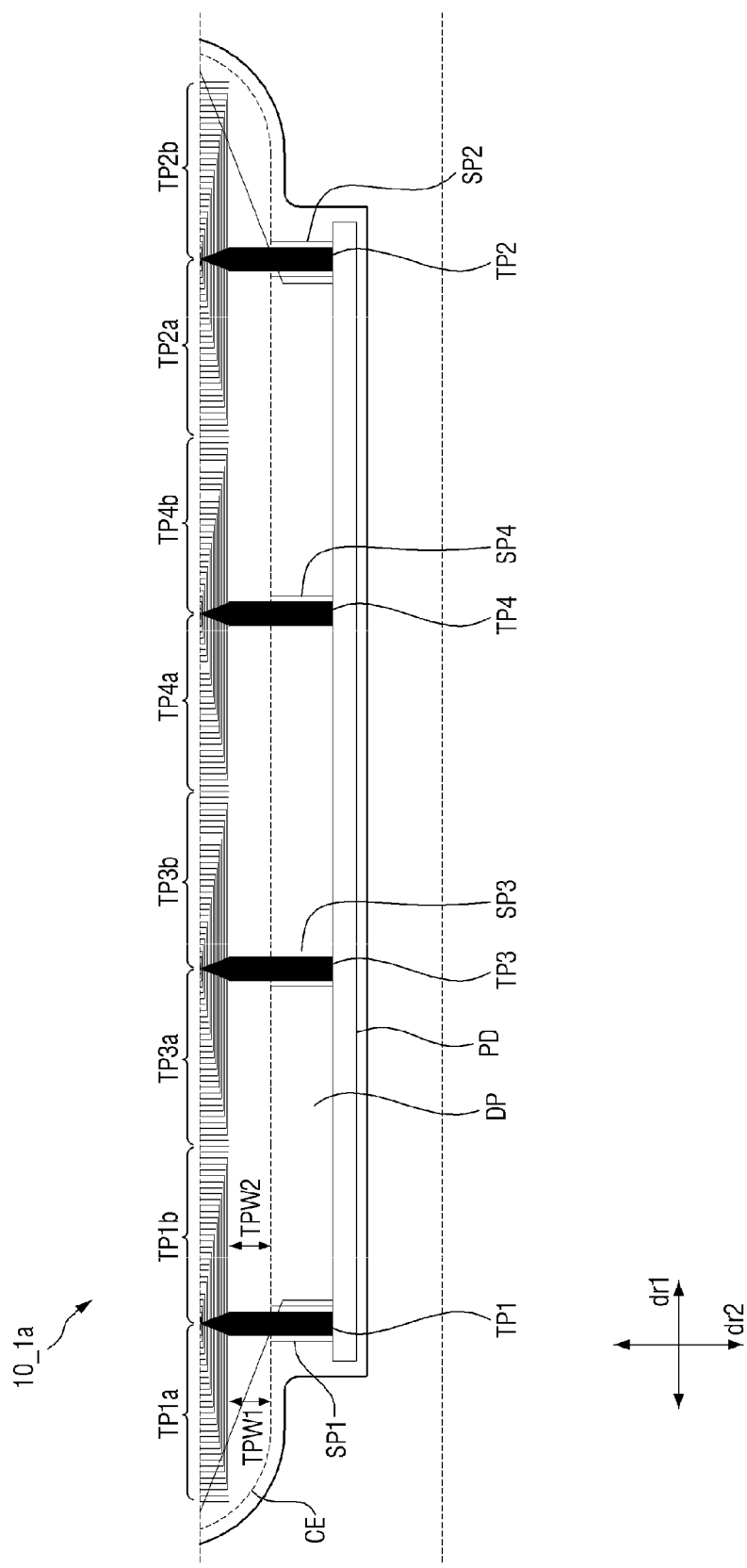
FIG. 12 is a view showing arrangement of lines in a non-display area of an organic light-emitting display device according to yet another exemplary embodiment of the present disclosure.

FIG. 12 is a view showing arrangement of lines in a non-display area of an organic light-emitting display device according to yet another exemplary embodiment of the present disclosure. FIG. 12 shows a modification of the exemplary embodiment shown in FIG. 3.

An organic light-emitting display device according to the exemplary embodiment shown in FIG. 12 is substantially identical to the organic light-emitting display device according to the exemplary embodiment shown in FIG. 3 except that the former further includes third and fourth touch line units TP3 and TP4 and third and fourth power line units SP3 and SP4 disposed on the inner side of the data line unit DP.

According to the exemplary embodiment of the present disclosure, the first and second touch line units TP1 and TP2 and the first and second power line units SP1 and SP2 may be disposed more to the outside than the data line unit DP on one side and the opposite side in the first direction dr1, like above-described exemplary embodiment.

The organic light-emitting display device may further include third and fourth touch line units TP3 and TP4 and third and fourth power line units SP3 and SP4. The third touch line unit TP3 and the third power line unit SP3 may include an overlapping portion in the second direction dr2. In addition, the fourth touch line unit TP4 and the fourth power line unit SP3 may include an overlapping portion in the second direction dr2.

The third touch line unit TP3 and the fourth touch line unit TP4 may form a fan-out portion. In each of the touch line units TP1 to TP4, the number of touch lines extended toward one side in the first direction dr1 may be equal to the number of touch lines extended toward the opposite side in the first direction dr1. In addition, in each of the touch line units TP1 to TP4, the distance between the touch lines extended toward one side in the first direction dr1 and one edge of the common electrode CE may be equal to the distance between the touch lines extended toward the opposite side in the first direction dr1 and the edge of the common electrode CE.

In concluding the detailed description, those skilled in the art will appreciate that many variations and modifications can be made to the preferred embodiments without substantially departing from the principles of the present disclosure. Therefore, the disclosed preferred embodiments of the invention are used in a generic and descriptive sense only and not for purposes of limitation.

What is claimed is:

1. A display device comprising:
   a display area;
   a non-display area on an outer side of the display area;
   a data line unit comprising a plurality of data lines;
   a power line unit disposed over the plurality of data lines and comprising a plurality of power lines; and
   a touch line unit disposed over the power line unit, comprising a plurality of touch lines and comprising a fan-out portion,
   wherein the touch line unit comprises, in the fan-out portion, a plurality of first sub-touch line units extended toward one side in a first direction, and a plurality of second sub-touch line units extended toward an opposite side in the first direction,
   wherein a number of lines of the first sub-touch line units is equal to a number of lines of the second sub-touch line units, and
   wherein the touch line unit comprises a portion where the touch line unit overlaps with the power line unit.

2. The display device of claim 1, wherein the touch line unit and the power line unit are extended in a second direction intersecting the first direction in the portion where the touch line unit overlaps with the power line unit.

3. The display device of claim 2, wherein the portion where the touch line unit overlaps with the power line unit is located on an inner side of the data line unit.

4. The display device of claim 1, further comprising:
a common electrode formed over an entire surface of the display area,
wherein the common electrode is extended to the non-display area.

5. The display device of claim 4, wherein a region where the common electrode is formed comprises the fan-out portion.

6. The display device of claim 5, wherein the common electrode comprises an edge formed in the first direction,
wherein the plurality of first sub-touch line units comprises a first touch line closest to the edge in the fan-out portion,
wherein the plurality of second sub-touch line units comprises a second touch line closest to the edge in the fan-out portion, and
wherein a distance between the first touch line and the edge is equal to a distance between the second touch line and the device.

7. The display device of claim 6, wherein the distance is equal to or greater than 72 μm.

8. The display device of claim 4, wherein the common electrode is electrically connected to at least one power line among the power line unit.

9. The display device of claim 1, further comprising:
a data pad terminal unit connected to the data lines;
a power pad terminal unit connected to the power lines; and
a touch pad terminal unit connected to the touch lines,
wherein the touch pad terminal unit, the power pad terminal unit, and the data pad terminal unit are sequentially spaced apart from one another in the first direction.

10. The display device of claim 9, wherein the data lines are extended in a second direction intersecting the first direction from the data pad terminal unit, and
wherein the touch lines comprise a portion extended in the second direction and a portion bent toward the data line unit.

11. The display device of claim 9, wherein the display device comprises a region adjacent to one edge of the non-display area, where the data pad terminal unit, the power pad terminal unit and the touch pad terminal unit are formed, and
wherein the display device comprises a bending region between the display area and the region where the data pad terminal unit, the power pad terminal unit and the touch pad terminal unit are formed.

12. The display device of claim 11, wherein the display device comprises in the bending region a region where the touch line unit overlaps with the power line unit.

13. The display device of claim 1, further comprising:
a plurality of touch sensing electrodes disposed in the display area,
wherein the plurality of touch sensing electrodes comprises:
a plurality of first touch sensing electrodes extended in a predetermined direction; and
a plurality of second touch sensing electrodes disposed adjacent to the first touch sensing electrodes in a direction intersecting the direction in which the plurality of first touch sensing electrodes is extended,
wherein a width of the second touch sensing electrodes is smaller than a width of the first touch sensing electrodes, and
wherein the plurality of first touch sensing electrodes and the plurality of second touch sensing electrodes are electrically connected to the respective touch lines.

14. The display device of claim 13, wherein the plurality of second touch sensing electrodes is extended in a same direction as a direction in which the plurality of first touch sensing electrodes is extended.

15. The display device of claim 13, wherein the plurality of second touch sensing electrodes is extended in a second direction intersecting the first direction.

16. A display device comprising:
a base substrate comprising a display area where a plurality of pixels and a plurality of touch electrodes are disposed, and a non-display area on an outer side of the display area;
a first line layer disposed on the base substrate in the non-display area;
a second line layer disposed over the first line layer in the non-display area; and
a third line layer disposed over the second line layer in the non-display area and comprising a fan-out portion,
wherein the second line layer and the third line layer comprise an overlapping region in the non-display area,
wherein each of the pixels comprises a transistor and a light-emitting element connected to the transistor,
wherein the first line layer is electrically connected to the transistor,
wherein the second line layer is electrically connected to the light-emitting element, wherein the third line layer is electrically connected to the touch electrode,
wherein the third line layer comprises, in the fan-out portion, a plurality of first sub-line unit units extended toward one side in a first direction, and a plurality of second sub-line unit units extended toward an opposite side in the first direction, and
wherein a number of the first sub-line unit units is equal to a number of the second sub-line unit.

17. The display device of claim 16, wherein the first line layer, the second line layer and the third line layer are insulated from one another.

18. The display device of claim 16, wherein in a region where the second conductive layer overlaps with the third conductive layer, the second conductive layer and the third conductive layer are extended in a second direction intersecting the first direction.

19. The display device of claim 18, wherein the touch electrodes comprise: a plurality of first sensing electrodes extended in the first direction; and a plurality of second sensing electrodes extended in the second direction and traversing the first sensing electrodes, wherein the first sensing electrodes are insulated from the second sensing electrodes.

20. The display device of claim 16, wherein the light-emitting element comprises a first electrode, an emissive layer disposed on the first electrode, and a second electrode disposed on the emissive layer,
wherein the second electrode is disposed through an entire surface of the display area,
wherein the second electrode is extended so that the third line layer covers the fan-out portion, and
wherein the second line layer is electrically connected to the second electrode.

* * * * *